United States Patent
Savioli

[19]

[11] Patent Number: 5,855,930
[45] Date of Patent: Jan. 5, 1999

[54] WORKHEAD FOR FORMING A PIPE BELL AT AN END OF A PIPE MADE OF THERMOPLASTIC MATERIAL

[75] Inventor: Leopoldo Savioli, Alfonsine, Italy

[73] Assignee: S.I.C.A. Serrande, Infissi, Carperteria, Attrezzatura S.p.A., Alfonsine, Italy

[21] Appl. No.: 518,464

[22] Filed: Aug. 23, 1995

[30] Foreign Application Priority Data

Aug. 23, 1994 [EP] European Pat. Off. .............. 94830407

[51] Int. Cl.⁶ .................................................. B28B 21/042
[52] U.S. Cl. ............ 425/387.1; 425/392; 425/DIG. 218; 264/573
[58] Field of Search ................... 425/387.1, 388, 425/DIG. 218, 393, 389, 390, 392; 264/523, 296, 526, 529, 573, 507, 322

[56] References Cited

U.S. PATENT DOCUMENTS

| | | | |
|---|---|---|---|
| 3,432,887 | 3/1969 | Poux et al. .............................. | 425/393 |
| 3,755,528 | 8/1973 | Gutlhuber et al. ...................... | 425/393 |
| 3,982,871 | 9/1976 | Woddel .................................. | 425/393 |
| 4,059,379 | 11/1977 | Korff et al. ..................... | 425/DIG. 218 |
| 4,161,384 | 7/1979 | Mcgregor ................................ | 425/388 |
| 4,266,926 | 5/1981 | Gordon .................................. | 425/393 |
| 4,428,900 | 1/1984 | Riley et al. .............................. | 264/573 |
| 4,620,959 | 11/1986 | Goto et al. .............................. | 425/437 |
| 4,957,676 | 9/1990 | Greenwood .............................. | 425/437 |

FOREIGN PATENT DOCUMENTS

| | | | |
|---|---|---|---|
| 0 081 883 | 12/1982 | European Pat. Off. ............... | 264/523 |
| 2184857 | 12/1973 | France . | |
| 2 395 123 | 1/1979 | France . | |
| 2 205 586 | 8/1973 | Germany . | |
| 22 13 561 | 10/1973 | Germany . | |
| 2 225 123 | 12/1973 | Germany . | |
| 2225123 | 12/1973 | Germany . | |
| 2 242 923 | 3/1974 | Germany . | |
| 2453272 | 5/1976 | Germany . | |
| 34 53 272 | 5/1976 | Germany . | |
| 26 36 940 | 3/1977 | Germany . | |
| 27 52 672 | 5/1979 | Germany . | |

*Primary Examiner*—Jay H. Woo
*Assistant Examiner*—Robert Hopkins
*Attorney, Agent, or Firm*—Pillsbury Madison & Sutro LLP

[57] ABSTRACT

A pressurized-fluid workhead for permanent belling of end portions of plastic pipes. A die has a cavity for receiving a thermally plasticized end portion of a pipe. A forming buffer is insertable into the end portion of the pipe and arranged centrally of the die. A flange is mounted coaxially and slidably with respect to the buffer and die and has a striking surface which can be associated to an edge of the end portion of the pipe. Sealing elements are located on the die and the buffer. These interact with an external surface and an internal surface of the end portion of the pipe. The die, the buffer and the flange together peripherally define a forming chamber for the end portion of the pipe. The forming chamber is subdivided by the pipe into first and second pressure chambers for a fluid. The first pressure chamber is arranged between the lateral surface of the buffer and the internal surface of the pipe. The second chamber is arranged between the external surface of the pipe and the internal surface of the die. The pressure chambers being fed with pressurized fluid by conduits in the die and buffer to dilate and contract the end portion of the pipe, to produce ribbing on the pipe, for a pipe bell.

7 Claims, 4 Drawing Sheets

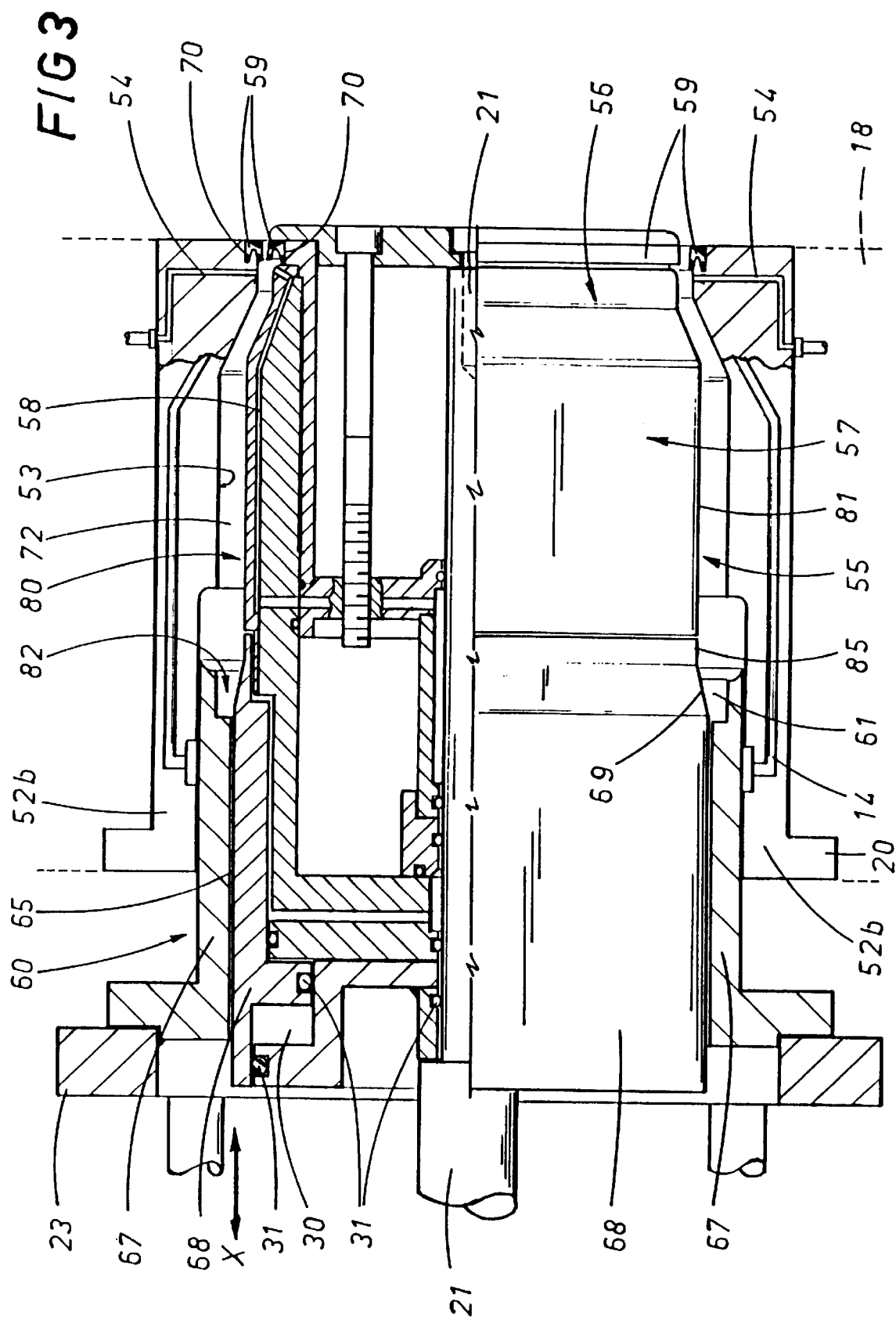

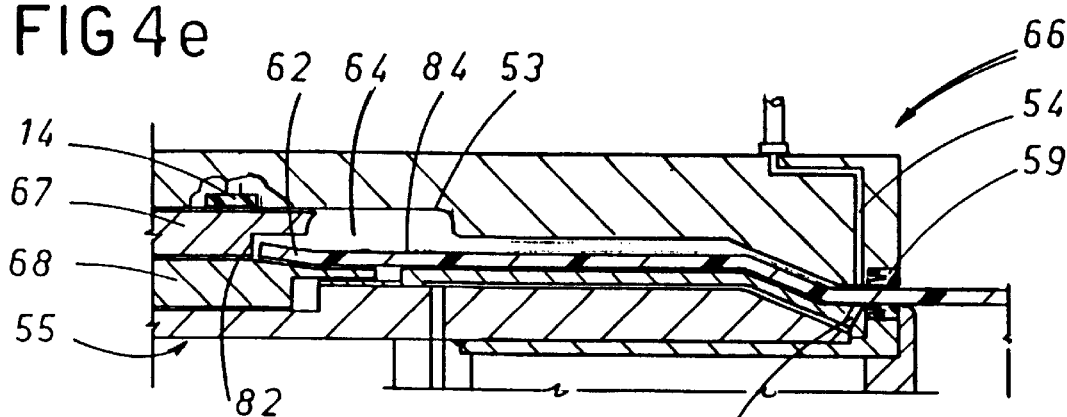
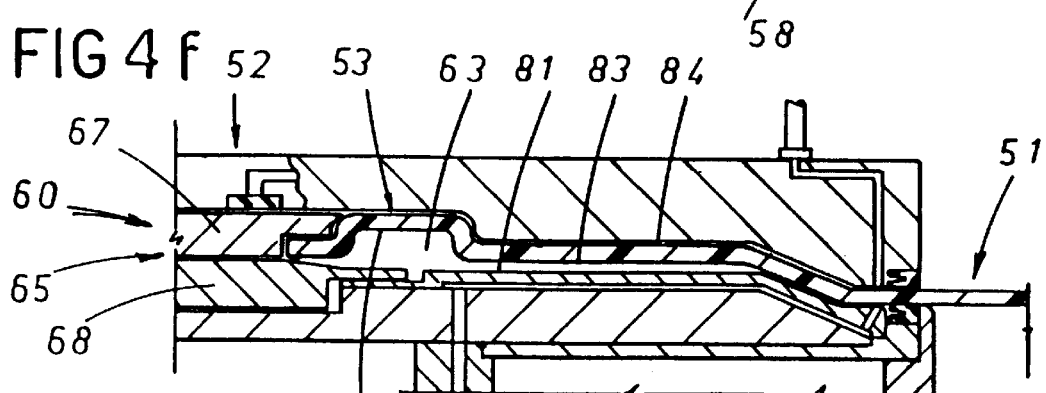
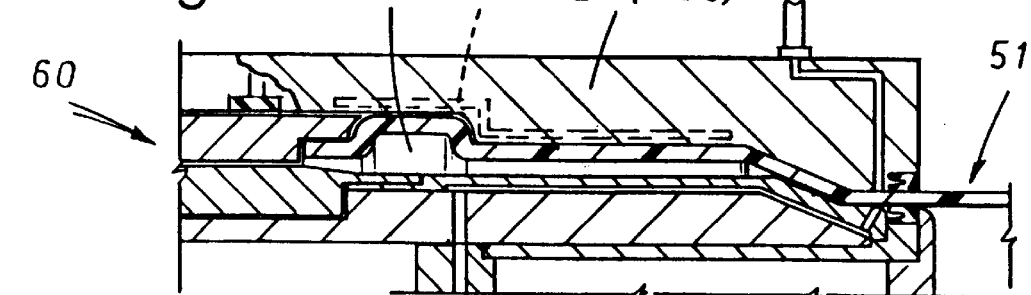
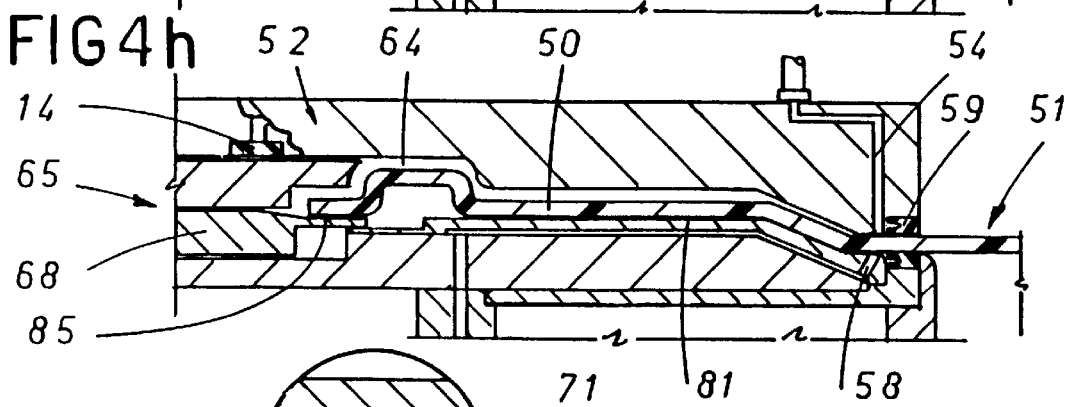
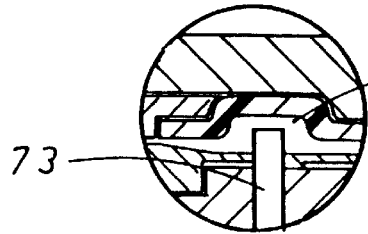

WORKHEAD FOR FORMING A PIPE BELL AT AN END OF A PIPE MADE OF THERMOPLASTIC MATERIAL

BACKGROUND OF THE INVENTION.

The invention relates to a work head for bell forming in automatic bell-forming machines, for pipe end portions made of plastic material, and in particular for pipes made of polyethylene and the like. In the manufacture of thermoplastic pipes destined for use in fluid conveyor pipelines, for example such as those used in the construction industry, bell-forming machines are employed to fashion at the pipe ends the characteristic bells which serve for connecting a plurality of individual pipes in succession, with the aim of obtaining a continuous pipeline of a desired length.

In a bell-forming machine, the pipe is associated to a special workhead which combines shaped buffer with forming chambers to heat-form the pipe to create a pipe bell in one end portion, cooling it inside the workhead in order to render the belling permanent.

Polyvinylchloride and ABS pipes and the like shrink during the above-mentioned cooling operation, and once cooled retain their shape permanently. The telescopic joining of the pipe spigots and bells thus never causes problems, even after a long period spent in a warehouse, or even after a prolonged exposition to a heat source, as happens, for example, in the case of pipes left exposed to the heat of the sun for long periods.

This dimensional and geometric stability is not at present attainable with pipes made of polyethylene, as pipes made of this material, at the end of the bell-forming process performed in a traditional bell-forming machine, remain in a state of internal tension which is apparently stable but which as soon as the pipe is subjected to solar rays or hostile thermal conditions, causes the shrinking process to recommence such that, often, the final shape and dimensions of the pipe are no longer compatible with the tolerances required for fitting.

This instability and the extreme difficulty of controlling the shrinkage of the belled end of the pipe inhibits the use of polyethylene in such applications.

Polyethylene, however, boasts provides several advantages: durability over a long period of time, weight, flexibility, and adaptability at the workplace, which overcome the disadvantage of fairly high cost, and render it a popular choice.

The prior art teaches no bell-forming machine which is capable of belling polyethylene pipes, and indeed other special equipment is used to bell-form them, all of which involve expensive constructional processes requiring the preparation of the tube and bell in separate parts, with specialized operations for welding them together when the pipe in place at a location of use.

SUMMARY OF THE INVENTION

The main aim of the present invention, is thus to obviate the problem of belling polyethylene pipes using automatic bell-forming machines, by using a special workhead essentially comprising:

a) a die member having a cavity to receive a thermally plasticized pipe and being provided with flow conduits for a pressurized fluid leading into the cavity;

b) a forming buffer, insertable into the end of the portion of the pipe which is to be expanded to form the pipe bell, the forming buffer being arranged centrally to the die; the buffer further having particularly shaped lateral surfaces from which flow pipes for a pressurized fluid leave;

c) a flange mounted coaxially and slidably with respect to the buffer and die, as well as having a striking surface which is associable to an edge of the pipe; and d) sealing elements located on the internal surface of the die and on the lateral surface of the buffer and destined to interact respectively with the external and internal surfaces of the pipe, enabling the sealed insertion of the pipes in the workhead.

The die, the buffer, the flange and the sealing elements together define a closed forming chamber, subdivided by the pipe into a first and a second pressure chamber for a fluid. The first pressure chamber is arranged between the lateral surface of the buffer and the internal surface of the pipe; whereas the second chamber is arranged between the external surface of the pipe and the internal surface of the die. The pressure chambers can be fed by die conduits and the buffer conduits such as circumferentially and successively to dilate the end portion of the pipe and contract it, to produce ribbing of the pipe material by pressing it first against the internal surface of the die and then against the external surface of the buffer.

A fundamental advantage obtained by use of the invention is that the polyethylene pipes can be bell-formed into time-tested shapes and dimensions.

Other advantages of the invention are its rapidity and the economy of the operative process performed by the said workheads, which means, in effect, that, with a single operation on the pipe inside the workhead, a perfectly finished pipe bell can be obtained on the pipe which needs no further operations performed on it before the pipe is used at a workplace.

BRIEF DESCRIPTION OF THE DRAWINGS.

Further characteristics and advantages of the present invention will better emerge from the detailed description that follows, of an embodiment of the invention, illustrated in the form of a non-limiting example in the accompanying drawings, in which:

FIG. 3 is an axial section of the workhead, on an enlarged scale and with some parts removed better to show others; and FIGS. 4a, 4b, 4c, 4d, 4e, 4f, 4g, 4h and 4i schematically show the workhead in the operative phases of a work cycle.

DESCRIPTION OF THE PREFERRED EMBODIMENTS.

Figure 1:
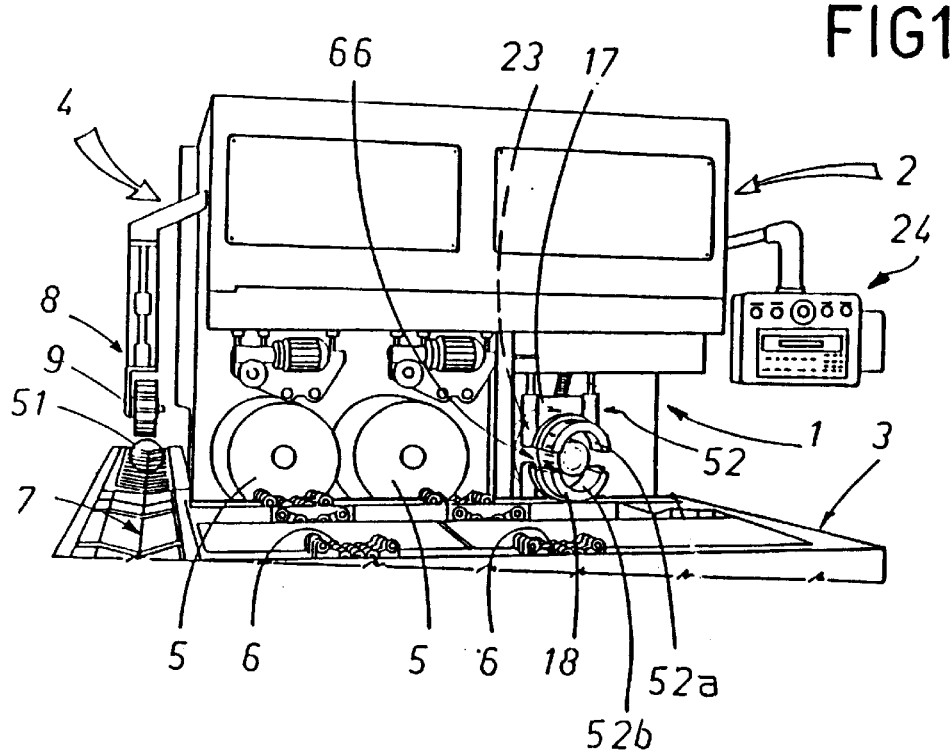
FIG. 1 is a perspective view of an assembly of a bell-forming machine comprising the workhead of the invention.

With reference to the figures of the drawings, FIG. 1 shows a bell-forming machine, indicated in its entirety by 1, used to bell end portions 50 of pipes 51 made if a plastic material, preferably high-density polyethylene.

The machine 1 comprises a workhead 2, a bench 3 and a receiving device 4 for the pipes 51, the one end portions of which are to be belled.

The workhead 2 comprises a head 66 for permanently shaping end portions 50 of pipes 51, at the side of kilns 5 for thermal plasticization of the pipes 51 prior to the belling operation.

A pipe receiving device 4 is situated by the side of the bench 3 and comprises a horizontal channel 7 above which a motorized track conveyor 9, supported by the structure of the machine 1 is situated.

The pipes 51 are advanced along the channel 7 in a direction coinciding with their axis of symmetry, by the track conveyor 9, up until they arrive in a work position, in which conventional automatic gripping means, not shown in the figures, emerge from the bench 3 and transfer them parallel to their own direction and transversally to their final direction, on supports 6 of the bench 3, in a programmed step movement.

The supports 6 hold the pipes 51 projectingly from the bench 3 towards the kilns 5, in combination with upper drawing mechanisms 10, which not only grip the pipes 51 but also rotate them, while the kilns 5, after being advanced towards the pipes 51 and associating with the pipe end portion 50 heat the ends and plasticize them.

When the plasticization is complete, the pipes 51 are brought to the head 66 where the end portions 50 are belled.

Figure 2:
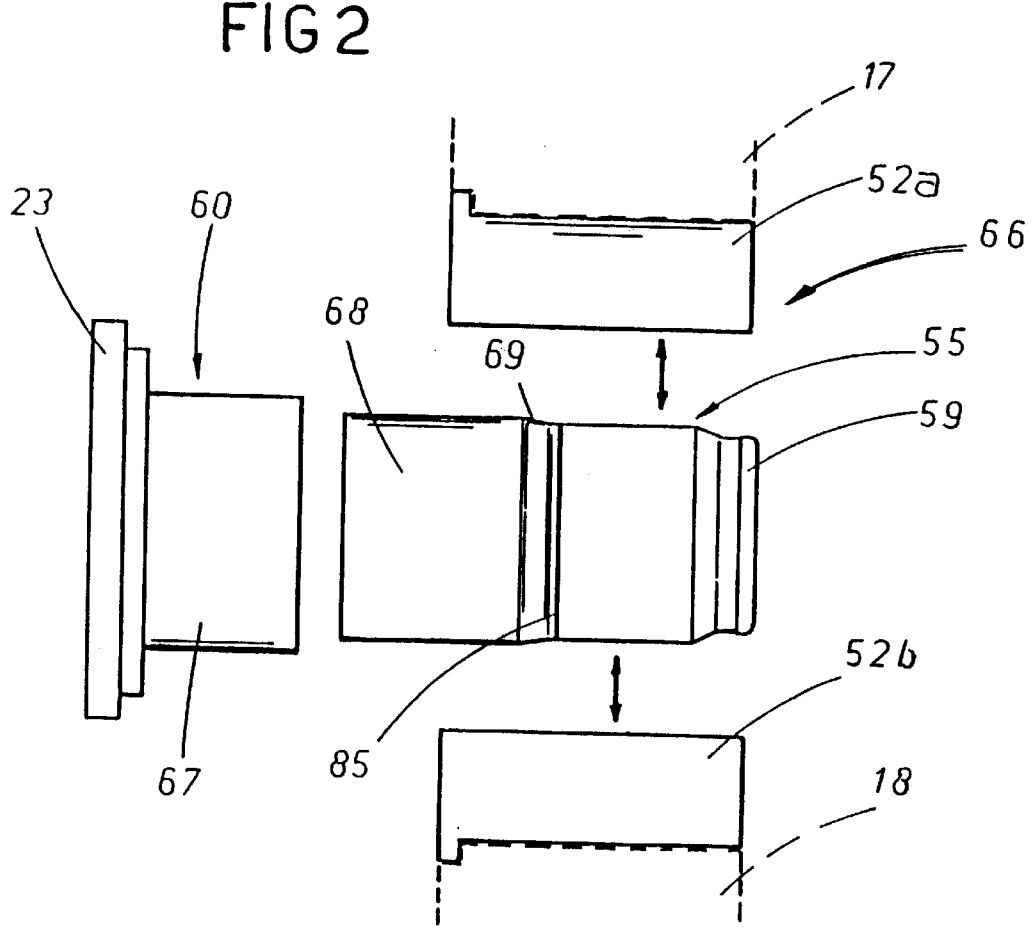
FIG. 2 shows a lateral view of the whole assembly, the workhead being shown with some parts removed.

The head 66 (FIGS. 2 and 3) comprises a die 52 which is externally associable to the pipe 51, a buffer 55 arranged centrally to the die 52 and a flange 60 mounted coaxially and slidably with respect to the buffer 55 and the die 52.

The die 52 is shown provided in two circumferentially complementary parts 17 and 18, which respectively each bear a half-die 52a, 52b. The term "die" is used herein for collectively referring to the assembly of die halves 52a, 52b.

The die 52 is further provided with a cavity 80 for receiving an end portion 50 of pipe 51, already plasticized in the kilns 5, and has an internal surface 53 which is shaped to correspond with the external surface 84 the finished bell will assume.

The die 52 is further provided with conduits 54 for a pressurized fluid, constituted by compressed air, which conduits 54 open into the cavity 80 of the internal surface 53, the function of which will be better explained hereinafter.

The buffer 55 is removably keyed on a buffer bearer 21 and is insertable internally into the longitudinal bore of the pipe 51. The buffer has a shaped lateral surface 81 composed of a body 57 and a front end 56, and is finally provided with flow conduits 58 for a pressurized fluid at the front end 56.

Sealing elements 59 are housed in special seats 70 on the internal surface 53 of the die 52 and on the front end 56 of the buffer 55, and are also situated bilaterally to the pipe 51 when the latter is inserted between the buffer 55 and the die 52. Their purpose is to interact with the internal and external surfaces 83, 84 of the pipe 51 so that the pipe 51 can be inserted in the head 66 under pressure-sealed conditions (FIG. 4).

A sealing gasket 14 is also arranged for the same reasons at the coupling surfaces 20 where the two parts 17, 18 of the die halves 52a, 52b couple to each other to form the complete die 52.

The flange 60 is shaped such as to have a striker surface 82 for the pipe 51, made in an annular cavity 61 facing and associable to an edge 62 of the pipe end portion 50.

When the buffer 55 and the die 52 are coupled, an annular forming chamber 72 is created in the head 66, which chamber 72 is provided for forming the pipe end portion 50. The peripheral limits of the forming chamber 72 are defined as follows: externally, the die 52; internally, the buffer 55; on one side the flange 60 and on the opposite side the sealing elements 59.

The forming chamber 72, after the buffer 55 has been completely introduced into the pipe 51 and consequently the edge has contacted with the flange 60, is subdivided by the pipe 51 into a first and a second pressure chamber 63 and 64 for a fluid. The first chamber 63 (see FIG. 4) is arranged between the lateral surface 81 of the buffer 55 and the internal surface 83 of the pipe 51, while the second chamber 64 is arranged between the external surface 84 of the pipe 51 and the internal surface 53 of the die 52.

The chambers 63, 64 are supplied by the conduits 54, 58, as will better appear from the functional explanation of the head 66 hereinbelow, such as to dilate and then to contract the pipe end portion 50 in order to induce a ribbing in the plastic material of the pipe 51, pressing it first against the internal surface 53 of the die 52 and then against the external surface of the buffer 55.

FIGS. 1 and 3 further show how the flange 60 is supported by a mobile ring 23 in the bell-forming machine 1, the ring 23 being mobile in direction X and comprising two concentric flange elements 67, 68 together forming the annular cavity 61. The flanges elements 67, 68 are slidably mounted one to the other and are independently mobile with respect to the die 52 and buffer 55. In particular, the more external flange element 67 moves in relation to the buffer 55 and the die 52 solidly with the ring 23, while the more internal flange element 68 moves by means of a pneumatic activation internally of a guide 30 borne by the buffer 55 and provided with sealing elements 31. Similar sealing elements 31 are placed at all possible fluid leak points about the head 66.

Preferably a fluid outlet channel 65 from the head 66 is provided at the annular cavity 61.

The channel 65 can be opened and closed by a conventional solenoid valve, not shown in the figures, piloted by the programmed control system 24 of the machine 1. Obviously, the channel is controlled according to the needs of the functional cycle of the head, permitting closure and pressurization of the first and the second chambers (63, 64) up to when they reach preestablished limit pressure values, at which point the channel 65 is opened and the fluid contained in the chambers 63, 64 evacuated from the head 66.

Turning to FIGS. 3 and 4, the internal flange element 68 is shaped such as to present an inclined wall 69, diverging from the pipe 51 axis and distancing from the pipe end portion 50 thereof, and having the function of guiding the edge 62 of the pipe 51 and channelling it into the annular channel 61.

The flange element 68 further comprises an annular portion 85 connected to the inclined wall 69, internally associable to the pipe 51 such as to meet it, opposite to the pressure of the fluid operating in the second pressurization chamber, and providing continuity of contact with the buffer 55.

If the pipe 51 is to be internally provided with a throat 71 (see FIG. 4a–4i) for housing a sealing gasket, the buffer 55 is internally provided with a forming insert 73 (FIG. 4i) which is radially translatable with respect to the pipe 51 from a first, rest position in which the insert 73 is hidden in the buffer 55 to an operative position in which the insert 73 exits from the buffer and associates with the pipe 51 to calibrate the required throat 71. In this case the semiflange 68 and the insert 73 are phase-synchronizedly mobile such as to avoid mutual interference during their reciprocal movements.

With reference to FIGS. 4a–4i, a generalized functional sequence of the head 66 is described.

In the initial phase (FIG. 4a) after the die 52 is opened, the head is neared to a plasticized pipe end portion 50, supported projectingly from the bench 3.

Then (FIG. 4b) the die halves 52a, 52b of the die 52 are locked on the pipe 51, together with their respective sealing elements 59 placed in direct contact with the external surface 84 of the pipe 51. The pressurized air is sent to the forming chamber 72 of the buffer flow conduits 58, and the buffer 55 begins to advance, inserting into the longitudinal bore of the pipe 51 at the respective one end. The external semiflange 67 is in its initial position, immobile, and therefore at its greatest distance from the pipe 51. In the phase shown in FIG. 4c, the buffer 55 gradually inserts into the pipe 51, producing a first widening thereof. The internal flange element 68 is arranged in a position of maximum advancement on the buffer 55, together with which it is inserted into the pipe 51.

During this phase the pressurized air coming from the conduits 58 is not able to cross the sealing element 59 arranged at the front end 56 of the buffer 55 and thus flows back between the lateral surface 81 of the buffer 55 and the internal surface 83 of the pipe 51. This pressurized air exits externally of the head 66 through the discharge channel 65 of the annular cavity 61, which is not closed by its valve. The advanced position of the internal flange element 68 in relation to the buffer 55 enables the pipe 51 to be supported continuously on the inclined wall 69 and the annular portion 85 of the internal flange element 68.

Figure 4A:
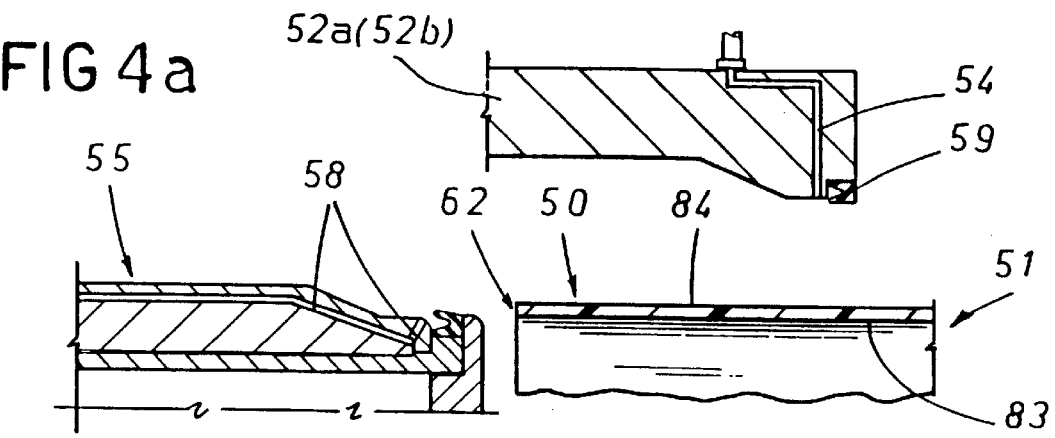
Figure 4B:
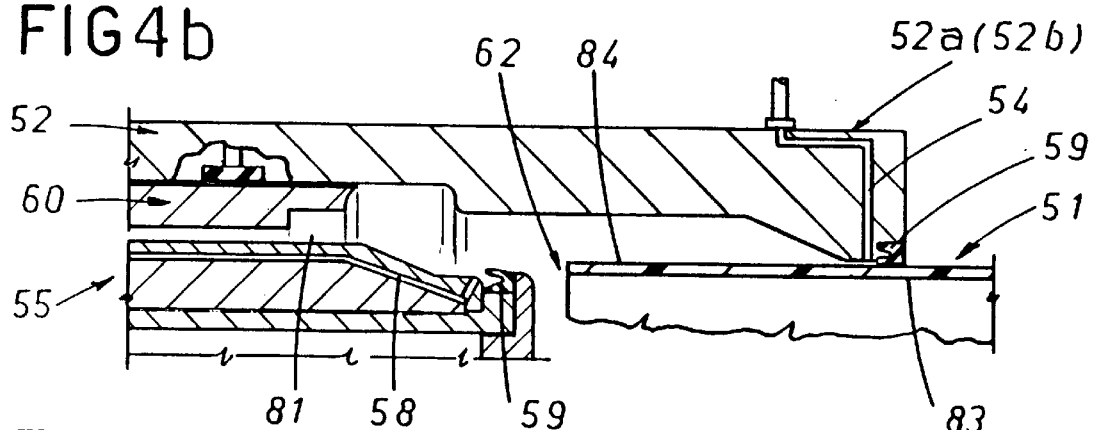
Figure 4C:
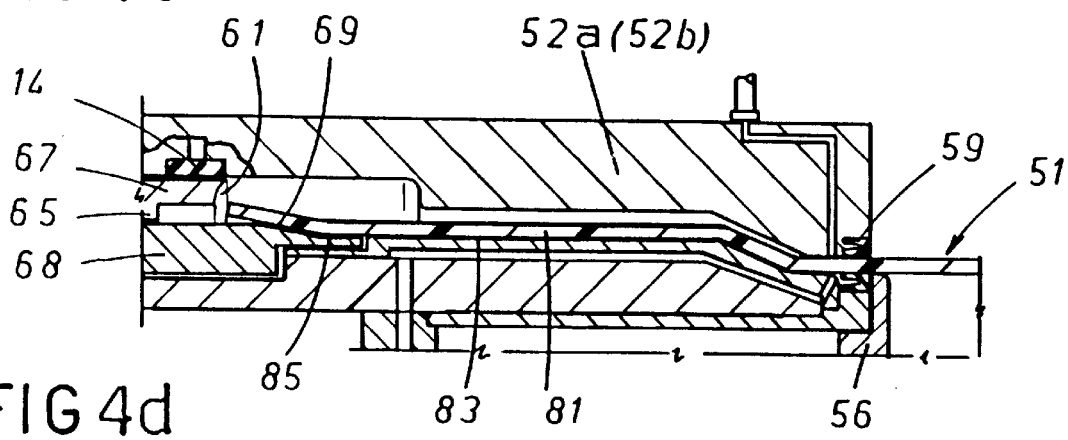
Figure 4D:
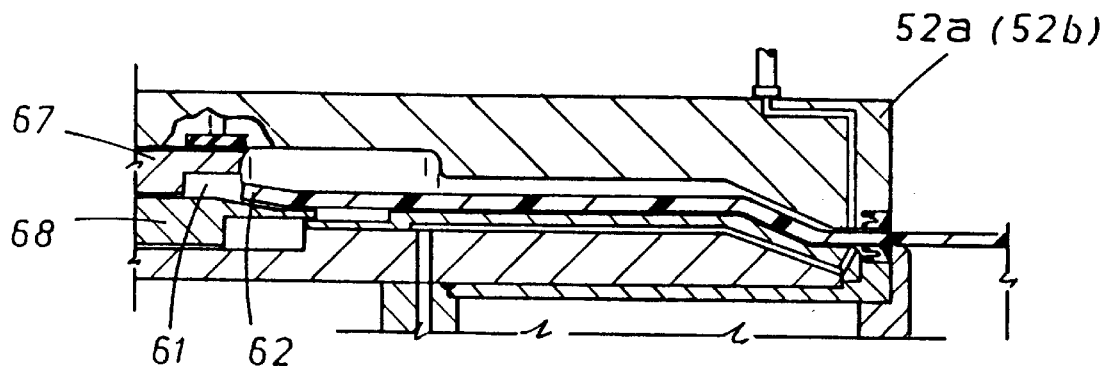

In the schematized illustration in FIG. 4d, the internal flange element 68 retracts such as to combine with the external flange element 67 to create an annular cavity 61 of greater dimensions for channelling the edge 62 of the bell 51 which tends to lock on to the buffer 55 due to the elastic return properties of the polyethylene.

In the phase illustrated in FIG. 4e the external flange element 67 and the internal flange element 68 advance together towards the buffer 55 up until the striker surface 82 meets with the edge of the pipe 51 and subdivides the forming chamber 72 into the first and second pressure chambers 63, 64.

The phase illustrated in FIG. 4f shows the discharge channel as it is closed by its own valve, such that as air continues to exit from the flow conduits 58 of the buffer 55 the first pressure chamber 63 is pressurized and expands the pipe 51 up until the external surface of the latter meets with the internal surface of the die 52. At the same time, the whole flange 60 advances along the buffer 55 and axially contracts the pipe 51. Obviously, the whole pipe is shortened in length by the modelling of a throat 71 in the bell for receiving a sealing gasket.

During the pressurization phase of the first pressure chamber 63, the pipe 51, upon meeting the internal surface 53 of the die 52, undergoes a circumferential dilatation up until its constituent material is ribbed.

In the phase illustrated in FIG. 4g, after the flange 60 is stopped, the pipe end portion 50 remains still for a period of time to let the material cool, a process aided by the cooling chamber 22, functioning with water and contained in the die 52. After a further commutation of the valve of the discharge channel 65 of the flange 60, the air contained in the first pressure chamber 63 can freely transit once more externally of the head 66. Thus, the buffer 55 can be cooled and can contribute further to the cooling of the pipe end portion 50.

In the phase illustrated in FIG. 4h, after a further closing of the discharge channel 65, air feeds into the flow conduits 54 of the die 52 and pressurizes the second pressure chamber 64. Consequently, the belled end of the pipe 51 locks on to the buffer 55 while the internal flange element 68 retracts in relation thereto and the pipe 51 rests on the lateral surface 81 of the buffer 55. When the pipe 51 has been contracted on the buffer 55, it is ribbed in an opposite direction to the ribbing of the phase illustrated in FIG. 4f. At the end of this operation, the second pressure chamber 64 is discharged through the channel, after which the buffer 55 is extracted from the pipe 51, and the internal flange element 68 is newly advanced on to the buffer 55, while the external flange element 67 is retracted and the die 52 is opened and the belled pipe 51 extracted. Then the whole cycle is repeated for another pipe.

If it should become necessary to calibrate the internal dimensions of the throat 71, after the phase illustrated in FIG. 4g, the phase of FIG. 4i may be proceeded to.

FIG. 4i illustrates a phase where the buffer 55 forming insert 73 is expanded after a partial retraction of the internal flange element 68 and prior to the pressurizing of the second chamber 64. Once the latter operation has been completed, the insert 73 reenters into the buffer 55, after which, once the internal flange element 68 has been fully retracted, all the conclusive operations of the described cycle, as in FIG. 4h, are proceeded to.

In conclusion, the head 66 of the workhead of the invention permits of belling a pipe end portion 50, where the pipe 51 is made of polyethylene, by means of a single introduction of the pipe 51 into the head 66, thus obtaining quickly and economically a single piece bell which will retain its proper form over a long period of time.

I claim:

1. A workhead operated by pressurized fluid in an automatic pipe bell-forming machine for forming a permanent pipe bell in a plastic pipe end portion, comprising:

a die having a cavity for receiving a thermally plasticized end portion of a plastic pipe having a throughbore which opens through one end of said pipe which is associated with said end portion, said die having a shaped internal surface and being provided with flow conduits for a pressurized fluid, which conduits exit from said shaped surface;

a forming buffer, insertable into said end portion of the pipe and arranged centrally to said die; said buffer having a shaped lateral surface and being provided with flow pipes for a pressurized fluid, which flow pipes exit from said lateral surface;

a flange mounted coaxially and slidably with respect to said buffer and die, and having a striking surface which is associable to an edge of the end portion of the pipe;

sealing elements located on the shaped internal surface of the die and on said buffer, and arranged to interact respectively with an external surface and an internal surface of the end portion of the pipe, enabling said pipe to be sealingly inserted in said workhead;

said die, said buffer and said flange together defining a periphery of a forming chamber for said end portion of the pipe, said forming chamber being arranged to be subdivided by the pipe into a first and a second pressure chamber for a fluid; the first pressure chamber being arranged to be located between the lateral surface of the buffer and the internal surface of the pipe; the second chamber being arranged to be located between the external surface of the pipe and the internal surface of the die; the first and second pressure chambers being arranged to be fed by said conduits circumferentially, and successively relative to one another so as to dilate and subsequently to contract the end portion of the pipe, and thereby produce a band of ribbing in said end portion of the pipe.

2. The workhead of claim 1, wherein:

said flange comprises an annular cavity opposite and associable to an edge of the pipe end portion, contained in the die, and thus to grip said end portion during pressurization of said first and second pressure chambers.

3. The workhead of claim 2, wherein:

said flange comprises at least one discharge channel for the fluid exiting from the forming chamber, said discharge channel being closable and arranged at said annular cavity.

4. The workhead of claim 2, wherein:

said flange is constituted by two concentric flange elements, comprising an internal flange element and an external flange element, which together form said annular cavity; said flange elements being slidably mounted in relation one to another, and being independently mobile in relation to said die and said buffer.

5. The workhead of claim 4, wherein:

said internal flange element comprises an inclined wall for guiding an edge of the pipe and for channelling the pipe into said annular cavity.

6. The workhead of claim 5, wherein:

said internal flange element comprises an annular portion connected to said inclined wall and internally associable to the pipe such as to provide a continuous rest surface for the pipe on said buffer.

7. The workhead of claim 4, wherein:

said buffer contains a forming insert which is translatable radially to the pipe from a first rest position of said forming insert in which said insert is completely housed in said buffer, to an operative position thereof in which said insert exits from the buffer and associates with the pipe to form in said pipe a throat.

* * * * *